US012672753B2

(12) United States Patent
Fawaz et al.

(10) Patent No.: US 12,672,753 B2
(45) Date of Patent: Jul. 7, 2026

(54) MULTI-STAGE DISHWASHER DRYING SYSTEM

(71) Applicant: Midea Group Co., Ltd., Beijiao (CN)

(72) Inventors: Bassam Fawaz, Louisville, KY (US); Alexi Blaise Poth, Louisville, KY (US)

(73) Assignee: MIDEA GROUP CO., LTD., Foshan (CN)

( * ) Notice: Subject to any disclaimer, the term of this patent is extended or adjusted under 35 U.S.C. 154(b) by 195 days.

(21) Appl. No.: 18/521,533

(22) Filed: Nov. 28, 2023

(65) Prior Publication Data

US 2025/0072704 A1 Mar. 6, 2025

Related U.S. Application Data

(63) Continuation-in-part of application No. 18/457,004, filed on Aug. 28, 2023.

(51) Int. Cl.

| | |
|---|---|
| ***A47L 15/00*** | (2006.01) |
| ***A47L 15/42*** | (2006.01) |
| ***A47L 15/48*** | (2006.01) |
| ***B01F 23/10*** | (2022.01) |
| ***B01F 35/21*** | (2022.01) |

(Continued)

(52) U.S. Cl.
CPC ....... *A47L 15/0034* (2013.01); *A47L 15/0013* (2013.01); *A47L 15/4214* (2013.01); *A47L 15/486* (2013.01); *A47L 15/488* (2013.01); *B01F 23/19* (2022.01); *B01F 35/2135* (2022.01); *B01F 35/222* (2022.01); *B01F 35/45* (2022.01); *B01F 35/712* (2022.01); *B01F 35/7181* (2022.01); *A47L 2401/18* (2013.01); *A47L 2401/19* (2013.01);
(Continued)

(58) Field of Classification Search
CPC ............................ A47L 15/486; A47L 15/488
See application file for complete search history.

(56) References Cited

U.S. PATENT DOCUMENTS 7,909,939 B2 3/2011 Brewer
8,231,737 B2 7/2012 Iwanaga
(Continued)

FOREIGN PATENT DOCUMENTS

CN 101406384 A 4/2009
CN 101657140 A 2/2010
(Continued)

OTHER PUBLICATIONS

CN216702500U Machine Translation (Year: 2022).*
(Continued)

*Primary Examiner* — Spencer E. Bell
(74) *Attorney, Agent, or Firm* — Gray Ice Higdon

(57) ABSTRACT

A dishwasher includes a drying system that incorporates a mixing conduit that mixes air streams from an exhaust fan that draws humid air from a wash tub, an inlet fan that supplies ambient air to the wash tub, and a gate device that is movable within a range of positions to regulate fluid flow through at least one of first and second inlets of the mixing conduit. A controller may perform a multi-stage drying operation that, in a first stage, controls the gate device while the inlet fan is deactivated, and in a second stage, additionally controls the speed of the inlet fan while controlling the gate device.

19 Claims, 7 Drawing Sheets

(51) Int. Cl.

*B01F 35/222* (2022.01)
*B01F 35/45* (2022.01)
*B01F 35/71* (2022.01)

(52) U.S. Cl.

CPC ....... *A47L 2401/34* (2013.01); *A47L 2501/10* (2013.01); *A47L 2501/12* (2013.01); *A47L 2501/36* (2013.01)

(56) References Cited

U.S. PATENT DOCUMENTS

| | | | |
|---|---|---|---|
| 8,469,043 B2 | 6/2013 | Tolf | |
| 10,506,912 B2 | 12/2019 | Kopera | |
| 10,575,708 B2 | 3/2020 | Thiyagarajan | |
| 10,939,796 B2 | 3/2021 | Kopera | |
| 2009/0038661 A1 | 2/2009 | Hildenbrand | |
| 2010/0083991 A1 | 4/2010 | Tolf | |
| 2016/0143507 A1* | 5/2016 | Tuller .................. | A47L 15/486 134/107 |
| 2017/0196431 A1 | 7/2017 | Hong | |
| 2019/0133412 A1 | 5/2019 | Hofmann | |
| 2020/0100644 A1 | 4/2020 | Kopera | |
| 2022/0104685 A1 | 4/2022 | Wolowicz | |
| 2023/0284865 A1 | 9/2023 | Ohayon | |
| 2023/0371778 A1 | 11/2023 | Kehrer | |

FOREIGN PATENT DOCUMENTS

| | | | |
|---|---|---|---|
| CN | 104039211 | A | 9/2014 |
| CN | 215838911 | U | 2/2022 |
| CN | 215838912 | U | 2/2022 |
| CN | 216702500 | U | 6/2022 |
| CN | 114795056 | A | 7/2022 |
| EP | 3666158 | A1 | 6/2020 |
| EP | 3440984 | A1 | 12/2021 |
| JP | 4093257 | B2 | 6/2008 |
| WO | 2004019750 | A1 | 3/2004 |
| WO | 2018224260 | A1 | 12/2018 |
| WO | 2025113261 | A1 | 6/2025 |

OTHER PUBLICATIONS

International Searching Authority, International Search Report and Written Opinion issued in Application No. PCT/CN2024/133022, 9 pages, dated Mar. 3, 2025.

Bell, Spencer E., United States Patent and Trademark Office, Non-Final Office Action issued in U.S. Appl. No. 18/457,004, 30 pages, dated May 14, 2025.

Bell, Spencer E., United States Patent and Trademark Office, Final Office Action issued in U.S. Appl. No. 18/457,004, filed Sep. 17, 2025.

* cited by examiner

MULTI-STAGE DISHWASHER DRYING SYSTEM

BACKGROUND

Dishwashers are used in many single-family and multi-family residential applications to clean dishes, silverware, cutlery, cups, glasses, pots, pans, etc. (collectively referred to herein as "utensils"). Drying utensils at the end of a wash cycle, however, can be time consuming, and can lead to extended cycle times.

One manner of decreasing the drying time in a dishwasher is to introduce ambient air into a wash tub to mix with water vapor present in the wash tub, and then exhausting the resulting humid air back into the surrounding environment. In many instances, a fan may be used to drive the air flow through the wash tub. In addition, in some instances, the ambient air may also be heated prior to introduction into the wash tub, as hotter air has a greater capacity to retain water vapor.

The rate at which air is circulated in this manner, however, is typically limited due to the relatively high humidity of the air being exhausted from the wash tub. In particular, if the dew point of the exhausted air is above the ambient room temperature, moisture in the exhausted air may undesirably condense on surfaces in the surrounding environment. As a result, many dishwasher designs limit the air flow rate through the wash tub to reduce condensation, but doing so increases the amount of time required to appropriately dry the utensils at the end of the wash cycle.

Therefore, a need exists in the art for a manner of accelerating drying of utensils at the end of a wash cycle performed by a dishwasher, while also limiting condensation on or around the dishwasher.

SUMMARY

The herein-described embodiments address these and other problems associated with the art by providing a dishwasher including a drying system that incorporates a mixing conduit that mixes air streams from an exhaust fan that draws humid air from a wash tub, an inlet fan that supplies ambient air to the wash tub, and a gate device that is movable within a range of positions to regulate fluid flow through at least one of first and second inlets of the mixing conduit. A controller may perform a multi-stage drying operation that, in a first stage, controls the gate device while the inlet fan is deactivated, and in a second stage, additionally controls the speed of the inlet fan while controlling the gate device.

Therefore, consistent with one aspect of the invention, a dishwasher may include a wash tub, at least one spray device disposed in the wash tub, a fluid supply configured to supply wash fluid to the at least one spray device, an air supply in fluid communication with the wash tub and configured to direct an inlet air stream into the wash tub, the air supply including an inlet fan in fluid communication with and upstream of the wash tub, an exhaust fan configured to draw a humid air stream from the wash tub from a position downstream of the wash tub, a mixing conduit including first and second inlets and an outlet, the first inlet of the mixing conduit in fluid communication with and downstream of the exhaust fan, and the second inlet of the mixing conduit configured to receive an ambient air stream that mixes with the humid air stream to thereby lower a dew point of the humid air stream exhausted from the outlet of the mixing conduit, a gate device disposed in the mixing conduit and movable within a range of positions to regulate fluid flow through at least one of the first and second inlets, and a controller coupled to the inlet fan and the gate device, the controller configured to, during a first stage of a multi-stage drying operation, vary a position of the gate device within the range of positions while the inlet fan is deactivated, and during a second stage of the multi-stage drying operation, vary the position of the gate device and vary a speed of the inlet fan while the inlet fan is activated.

In some embodiments, the controller is further configured to vary a speed of the exhaust fan during at least a portion of the drying operation. In addition, some embodiments may further include a mixing fan in fluid communication with and upstream of the second inlet of the mixing conduit and configured to direct the ambient air stream into the second inlet of the mixing conduit, and the controller is further configured to vary a speed of the mixing fan during at least a portion of the drying operation.

Some embodiments may further include at least one environmental sensor configured to sense an environmental condition of air exhausted from the outlet of the mixing conduit. Further, in some embodiments, the controller is coupled to the at least one environmental sensor and is configured to vary the speed of the inlet fan and the position of the gate device to maintain the dew point of the humid air stream exhausted from the outlet of the mixing conduit below a temperature of an ambient environment within which the dishwasher is installed. In some embodiments, the at least one environmental sensor is configured to sense a temperature and/or a humidity of the humid air stream exhausted from the outlet of the mixing conduit. In addition, in some embodiments, the controller is configured to determine the temperature of the ambient environment using the at least one environmental sensor and prior to performing a drying operation with the inlet fan, the exhaust fan and the mixing fan.

In some embodiments, the air supply further includes a heater configured to heat the inlet air stream. In addition, in some embodiments, the controller is configured to deactivate the heater during the first stage of the multi-stage drying operation and activate the heater during the second stage of the multi-stage drying operation. Moreover, in some embodiments, the first stage precedes the second stage and the controller is configured to transition from the first stage to the second stage in response to determining that the gate device is in a predetermined position and that the dew point of the humid air stream exhausted from the outlet of the mixing conduit is less than the ambient temperature.

Consistent with another aspect of the invention, a dishwasher may include a wash tub, at least one spray device disposed in the wash tub, a fluid supply configured to supply wash fluid to the at least one spray device, an air supply in fluid communication with the wash tub and configured to direct an inlet air stream into the wash tub, the air supply including an inlet fan in fluid communication with and upstream of the wash tub, an exhaust fan configured to draw a humid air stream from the wash tub from a position downstream of the wash tub, a mixing conduit including first and second inlets and an outlet, the first inlet of the mixing conduit in fluid communication with and downstream of the exhaust fan, and the second inlet of the mixing conduit configured to receive an ambient air stream that mixes with the humid air stream to thereby lower a dew point of the humid air stream exhausted from the outlet of the mixing conduit, a gate device disposed in the mixing conduit and movable within a range of positions to regulate fluid flow through at least one of the first and second inlets, and a controller coupled to the inlet fan and the gate device, the controller configured to vary a speed of the inlet fan and a position of the gate device within the range of positions during at least a portion of a drying operation.

In some embodiments, the controller is further configured to vary a speed of the exhaust fan during at least a portion of the drying operation. Some embodiments may also include a mixing fan in fluid communication with and upstream of the second inlet of the mixing conduit and configured to direct the ambient air stream into the second inlet of the mixing conduit, and the controller is further configured to vary a speed of the mixing fan during at least a portion of the drying operation.

Some embodiments may further include at least one environmental sensor configured to sense an environmental condition of air exhausted from the outlet of the mixing conduit. In some embodiments, the controller is coupled to the at least one environmental sensor and is configured to vary the speed of the inlet fan and the position of the gate device to maintain the dew point of the humid air stream exhausted from the outlet of the mixing conduit below a temperature of an ambient environment within which the dishwasher is installed. In addition, in some embodiments, the at least one environmental sensor is configured to sense a temperature and/or a humidity of the humid air stream exhausted from the outlet of the mixing conduit. In some embodiments, the controller is configured to determine the temperature of the ambient environment using the at least one environmental sensor and prior to performing a drying operation with the inlet fan, the exhaust fan and the mixing fan.

Moreover, in some embodiments, the ambient air stream directed into the second inlet of the mixing conduit is untreated. Also, in some embodiments, the air supply further includes a heater configured to heat the inlet air stream.

In some embodiments, the drying operation is a multi-stage drying operation including at least a first stage preceding a second stage, and the controller is configured to vary the position of the gate device within the range of positions while the inlet fan is deactivated during the first stage and to vary the speed of the inlet fan and the position of the gate device within the range of positions while the inlet fan is activated during the second stage.

Other embodiments may include various methods for making and/or using any of the aforementioned constructions.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
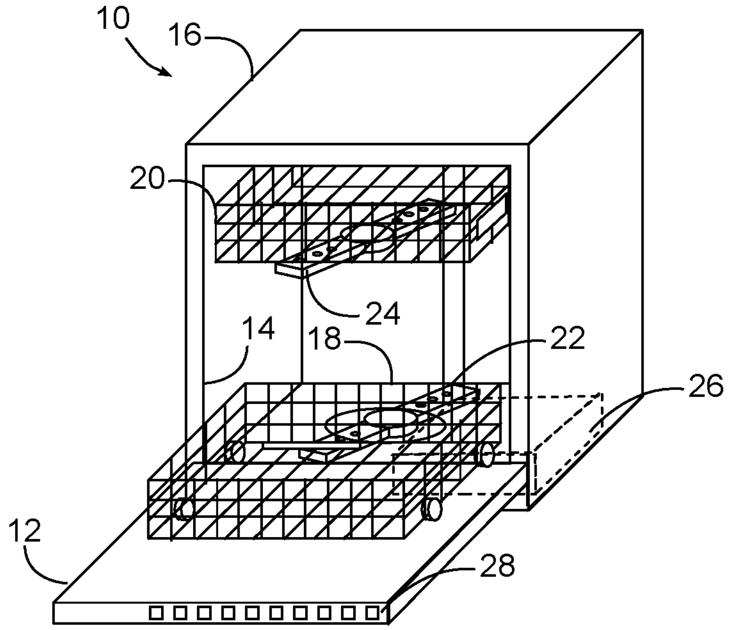
FIG. 1 is a perspective view of a dishwasher consistent with some embodiments of the invention.

Turning now to the drawings, wherein like numbers denote like parts throughout the several views, FIG. 1 illustrates an example dishwasher 10 in which the various technologies and techniques described herein may be implemented. Dishwasher 10 is a residential-type built-in dishwasher, and as such includes a front-mounted door 12 that provides access to a wash tub 14 housed within a cabinet or housing 16. Door 12 is generally hinged along a bottom edge and is pivotable between the opened position illustrated in FIG. 1 and a closed position (not shown). When door 12 is in the opened position, access is provided to one or more sliding racks, e.g., lower rack 18 and upper rack 20, within which various utensils are placed for washing. Lower rack 18 may be supported on rollers, while upper rack 20 may be supported on side rails, and each rack is movable between loading (extended) and washing (retracted) positions along a substantially horizontal direction. One or more rotating spray arms, e.g., lower spray arm 22 and upper spray arm 24, may also be provided to direct a spray of wash fluid onto utensils, e.g., upwardly into the respective rack 18, 20 under which is spray arm is disposed. In addition, and as will be discussed in greater detail below, dishwasher 10 also includes a drying system 26 for drying utensils at the end of a wash cycle.

Control over dishwasher 10 by a user is generally managed through a control panel 28 typically disposed on a top or front of door 12, and it will be appreciated that in different dishwasher designs, the control panel may include various types of input and/or output devices, including various knobs, buttons, lights, switches, textual and/or graphical displays, touch screens, etc. through which a user may configure one or more settings and start and stop a wash cycle.

The embodiments discussed hereinafter will focus on the implementation of the hereinafter-described techniques within a hinged-door dishwasher. However, it will be appreciated that the herein-described techniques may also be used in connection with other types of dishwashers in some embodiments. For example, the herein-described techniques may be used in commercial applications in some embodiments. Moreover, at least some of the herein-described techniques may be used in connection with other dishwasher configurations, including dishwashers utilizing sliding drawers.

Figure 2:
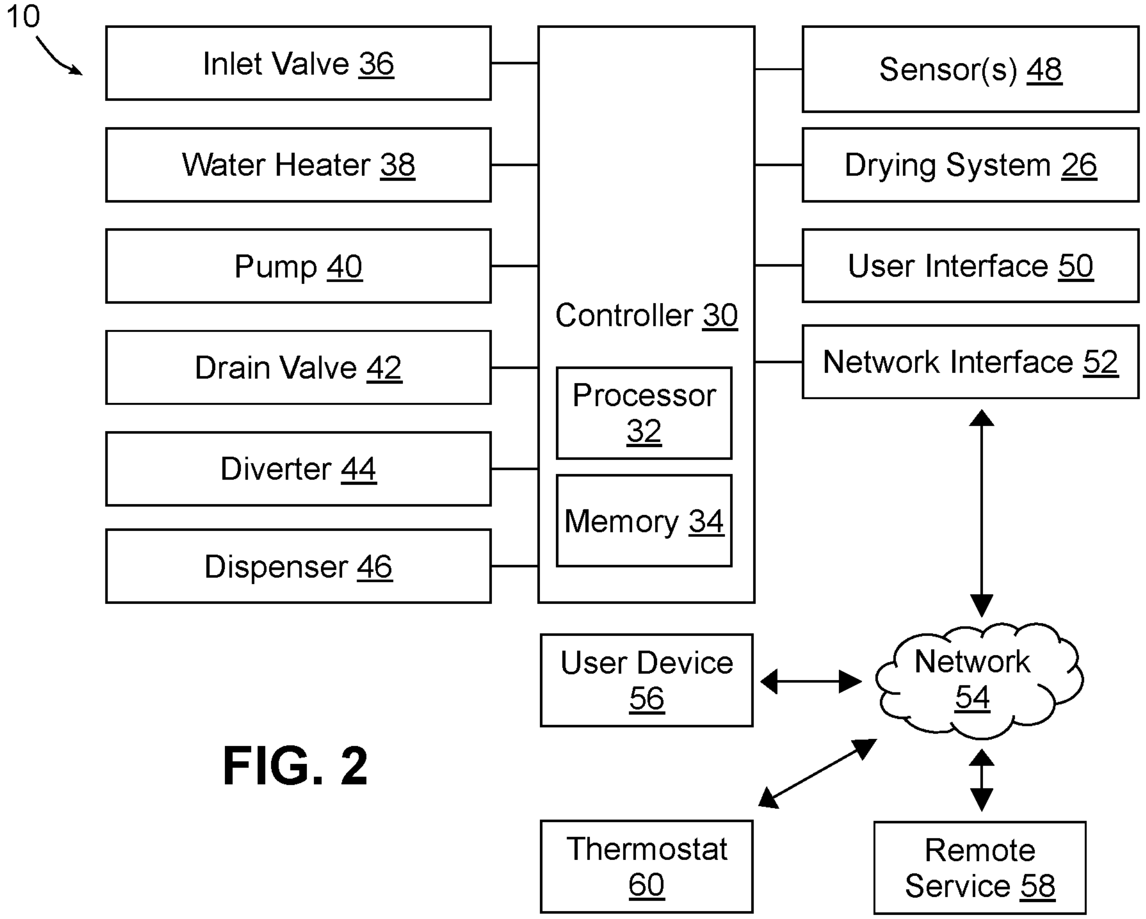
FIG. 2 is a block diagram of an example control system for the dishwasher of FIG. 1.

Now turning to FIG. 2, dishwasher 10 may be under the control of a controller 30 that receives inputs from a number of components and drives a number of components in response thereto. Controller 30 may, for example, include one or more processors 32 and a memory 34 within which may be stored program code for execution by the one or more processors. The memory may be embedded in controller 30, but may also be considered to include volatile and/or non-volatile memories, cache memories, flash memories, programmable read-only memories, read-only memories, etc., as well as memory storage physically located elsewhere from controller 30, e.g., in a mass storage device or on a remote computer interfaced with controller 30.

As shown in FIG. 2, controller 30 may be interfaced with various components, including drying system 26 as well as an inlet valve 36 that is coupled to a water source to introduce water into wash tub 14, which when combined with detergent, rinse agent and/or other additives, forms various wash fluids. A wash fluid may be considered to be a fluid, generally a liquid, incorporating at least water, and in some instances, additional components such as detergent, rinse aid, and other additives. During a rinse operation, for example, the wash fluid may include only water. A wash fluid may also include steam in some instances.

Controller 30 may also be coupled to a water heater 38 that heats fluids, a pump 40 that recirculates fluid within the wash tub by pumping fluid to the wash arms and other spray devices in the dishwasher, a drain valve 42 that is coupled to a drain to direct fluids out of the dishwasher, and a diverter 44 that controls the routing of pumped fluid to different wash arms and/or other sprayers during a wash cycle. In some embodiments, a single pump 40 may be used, and drain valve 42 may be configured to direct pumped fluid either to a drain or to the diverter 44 such that pump 40 is used both to drain fluid from the dishwasher and to recirculate fluid throughout the dishwasher during a wash cycle. In other embodiments, separate pumps may be used for draining the dishwasher and recirculating fluid. Diverter 44 in some embodiments may be a passive diverter that automatically sequences between different outlets, while in some embodiments diverter 44 may be a powered diverter that is controllable to route fluid to specific outlets on demand. Generally, pump 40 may be considered to be a fluid supply in some embodiments as pump 40 supplies a pressurized source of fluid to diverter 44 for distribution to one or more spray arms and/or sprayers.

Controller 30 may also be coupled to a dispenser 46 to trigger the dispensing of detergent and/or rinse agent into the wash tub at appropriate points during a wash cycle. Additional sensors 48 and actuators may also be used in some embodiments, including, for example, a temperature sensor to determine a wash fluid temperature, a door switch to determine when door 12 is latched, various turbidity or conductivity sensors, etc. Moreover, controller 30 may be coupled to a user interface 50 including various input/output devices such as knobs, dials, sliders, switches, buttons, lights, textual and/or graphics displays, touch screen displays, speakers, image capture devices, microphones, etc. for receiving input from and communicating with a user (e.g., at least partially disposed on control panel 28 of FIG. 1). In some embodiments, controller 30 may also be coupled to one or more network interfaces 52, e.g., for interfacing with external devices via wired and/or wireless networks 54 such as Ethernet, Bluetooth, NFC, cellular and other suitable networks. For example, dishwasher 10 may interface with one or more user devices 56, e.g., to permit consumer remote control of dishwasher 10 and/or to provide status information to a consumer. Dishwasher 10 may also interface with one or more remote services 58, e.g., for diagnostics, maintenance, system updates, remote control, and/or practically any other suitable purpose. Additional components may also be interfaced with controller 30, e.g., a thermostat 60 present in the same ambient environment within which the dishwasher is installed (among others), as the as will be appreciated by those of ordinary skill having the benefit of the instant disclosure.

Moreover, in some embodiments, at least a portion of controller 30 may be implemented externally from dishwasher 10, e.g., within a mobile device, a cloud computing environment, etc., such that at least a portion of the functionality described herein is implemented within the portion of the controller that is externally implemented. In some embodiments, controller 30 may operate under the control of an operating system and may execute or otherwise rely upon various computer software applications, components, programs, objects, modules, data structures, etc. In addition, controller 30 may also incorporate hardware logic to implement some or all of the functionality disclosed herein. Further, in some embodiments, the sequences of operations performed by controller 30 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the dishwasher illustrated in FIGS. 1-2 will be apparent to one of ordinary skill in the art, as will become apparent from the description below. Therefore, the invention is not limited to the specific implementations discussed herein.

Dishwasher Drying System

As noted above, the drying systems of many dishwashers utilize fans to force air, which in some instances may also be heated, through a wash tub to accelerate drying. Fan speeds, however, are typically limited due to the high humidity inside the wash tub, which can lead to condensation on external surfaces on and/or proximate the dishwasher when the dew point of the exhausted air is above the ambient room temperature.

In embodiments consistent with the invention, however, a mixing conduit may be used to mix air streams from an exhaust fan that draws humid air from a wash tub and a mixing fan that draws ambient air from the surrounding environment of the dishwasher to lower a dew point of the air that is exhausted by the dishwasher, and thereby reduce the likelihood of condensation on external surfaces on and/or surrounding the dishwasher. For the purposes of this disclosure, ambient air generally refers to air that is obtained from the environment surrounding the dishwasher, and which is generally representative of the air within the room in which the dishwasher is installed. Inlet air may be considered to refer to air that is being supplied to a wash tub during a drying operation, while exhaust air may be considered to refer to air that is being drawn or exhausted from a wash tub, which at least during the early stages of a drying operation, also may be considered to be humid air containing water vapor collected from the wash tub. Mixed exhaust air, in turn, refers to air that is a mixture of humid exhaust air drawn from the wash tub and ambient air that has been mixed with the humid exhaust air within the mixing conduit, and exhausted into the environment surrounding the dishwasher.

As will become more apparent below, in some instances, an additional inlet fan may be used to direct ambient air into the wash tub as inlet air, and in some instances, the ambient air directed into the mixing conduit by the mixing fan may be untreated, i.e., the ambient air is supplied to the mixing conduit without first being treated to control its temperature (e.g., with a heater or cooler) and/or humidity, such that the ambient air has substantially the same environmental characteristics of the room within which the dishwasher is located. In addition, in some embodiments, the ambient air is supplied to the mixing conduit independently from the supply of inlet air to the wash tub, such that the relative flow rates of the inlet air into the wash tub and the ambient air into the mixing conduit are independently controllable. In addition, in some instances, one or more of the fans may be variable speed fans, and the environmental conditions of the exhausted air and of the ambient environment (e.g., temperature and/or humidity) may be monitored during a drying phase of a wash cycle to control fan speed(s) to maintain the dew point of the exhausted air below the ambient room temperature.

Figure 3:
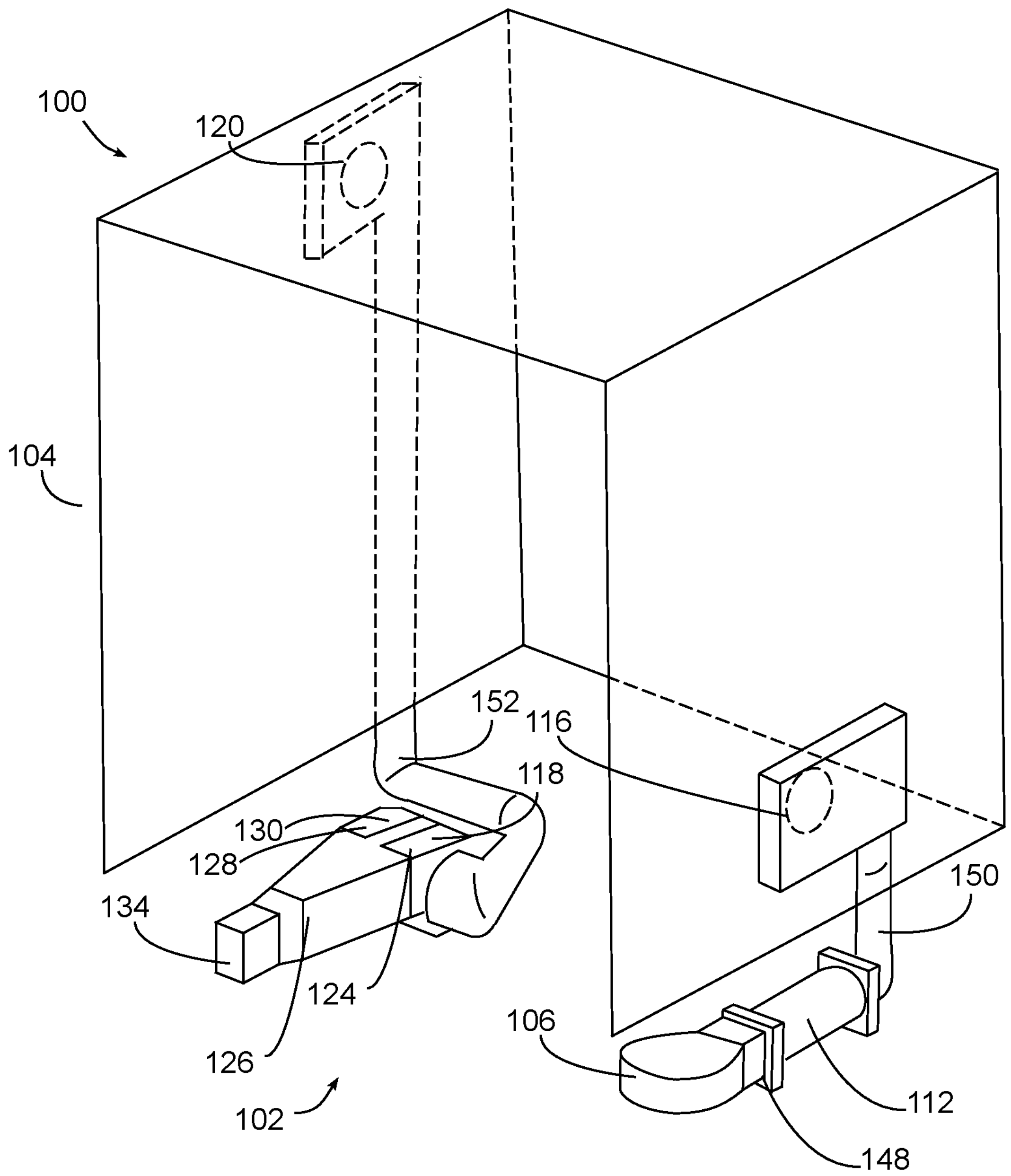
FIG. 3 is a perspective view of a portion of a dishwasher incorporating a drying system consistent with some embodiments of the invention.
Figure 4:
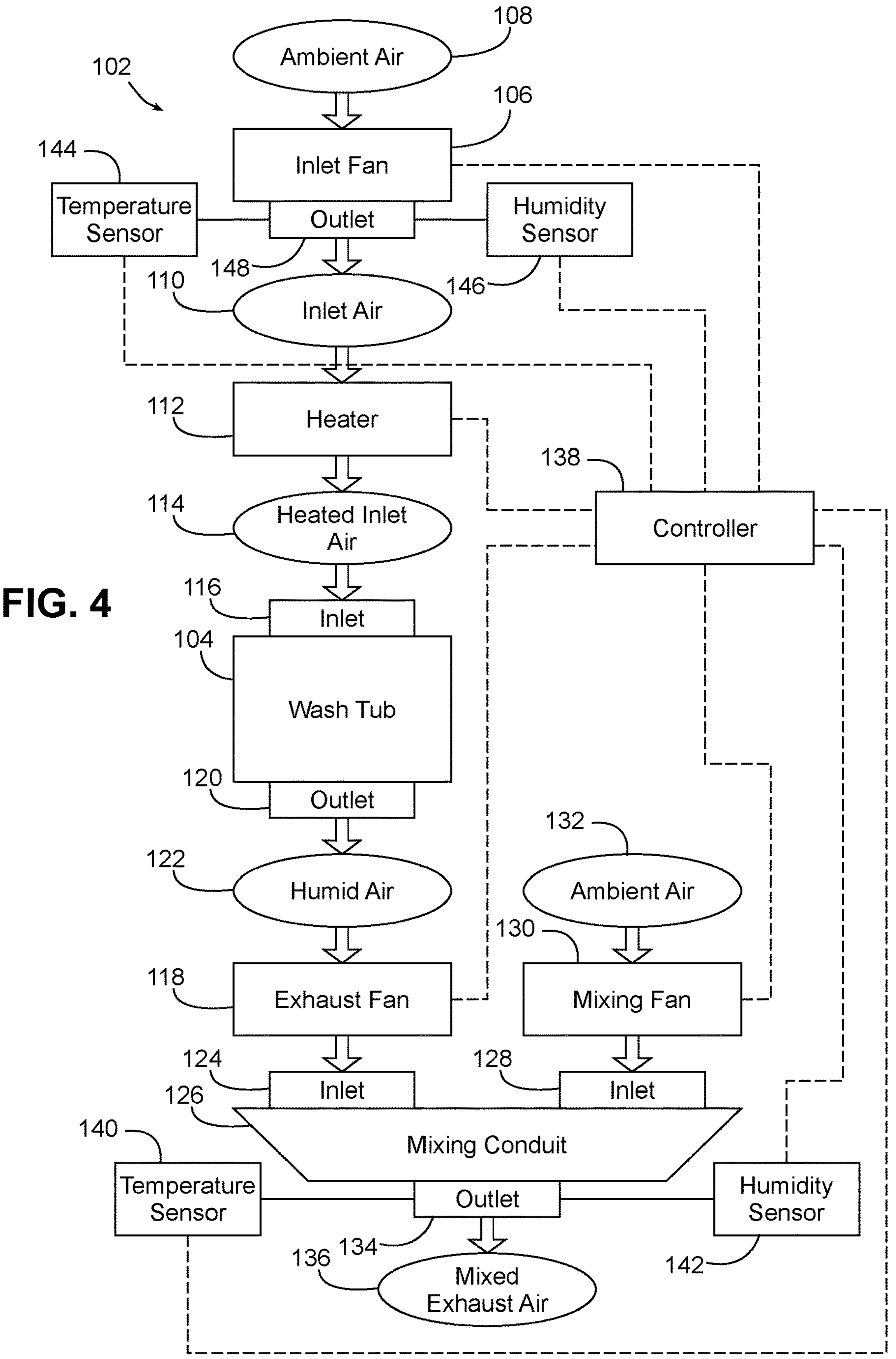
FIG. 4 is a block diagram of the drying system of FIG. 3.
Figure 5:
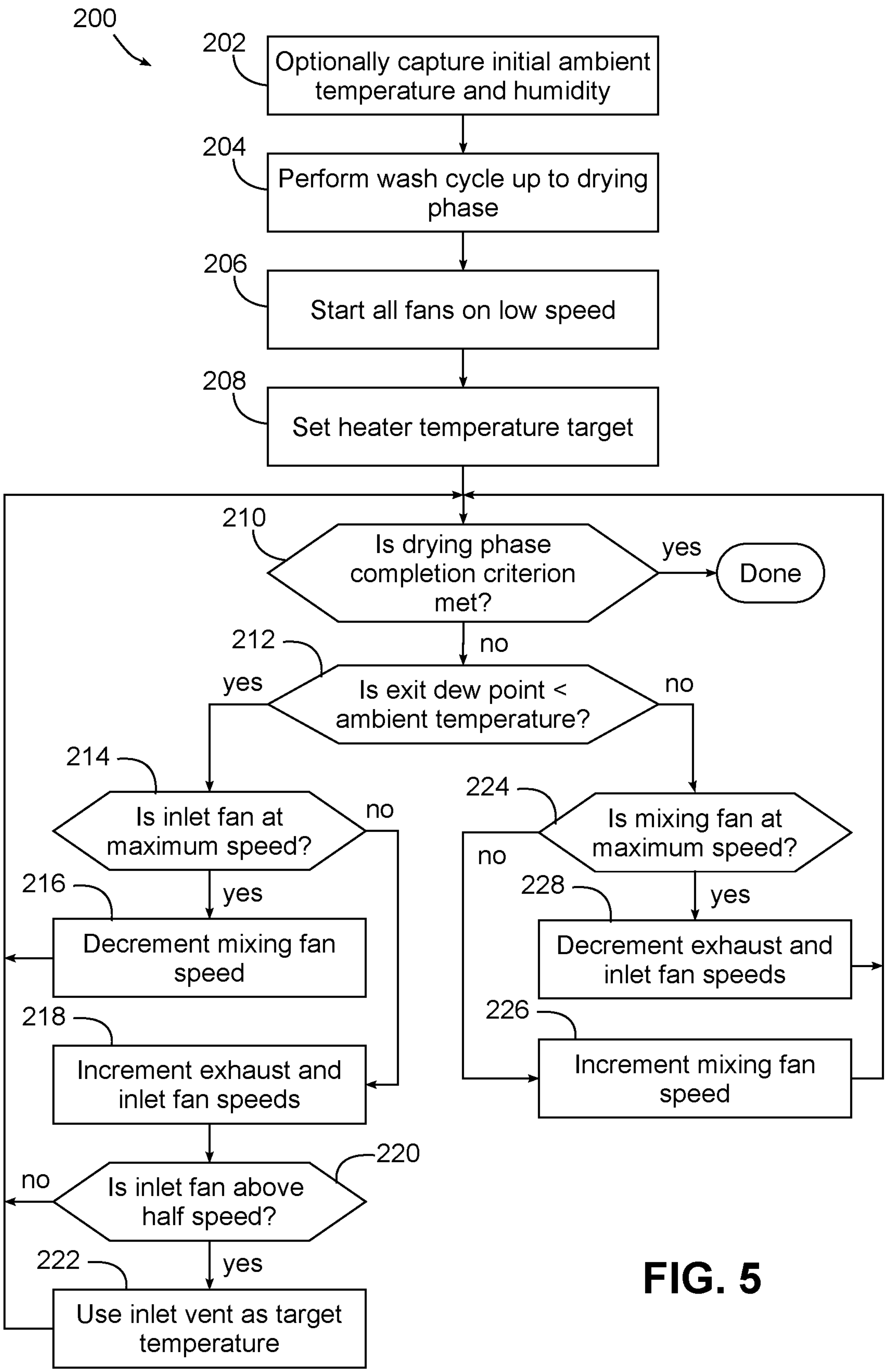
FIG. 5 is a flowchart illustrating an example operational sequence for performing a wash cycle in the dishwasher of FIG. 3.

FIGS. 3-5, for example, illustrate a dishwasher 100 including a drying system 102 consistent with some embodiments of the invention. FIG. 3, in particular, illustrates a wash tub 104 of dishwasher 100, along with various components of drying system 102 that are functionally illustrated in FIG. 4. In this embodiment, three fans are utilized to drive three primary air streams, an inlet air stream that is directed into wash tub 104, a humid air stream that is drawn out of wash tub 104, and an ambient air stream that that is mixed with the humid air stream to lower the dew point of the humid air stream prior to being exhausted out of the dishwasher.

With reference to FIGS. 3 and 4, an air supply for wash tub 104 may include an inlet fan 106 configured to draw in ambient air 108 from the environment surrounding the dishwasher to generate an inlet air stream 110. In some embodiments, it may also be desirable for the air supply to also heat the inlet air stream, e.g., by a heater 112, thereby generating a heated inlet air stream 114. The heated inlet air stream 114 is supplied to an inlet 116 of wash tub 104 during a drying phase of a wash cycle. The air supplied to the wash tub absorbs moisture present in the wash tub, and an exhaust fan 118 draws the now-humid air out of an outlet 120 in wash tub 104, forming a humid air stream 122.

Exhaust fan 118 directs the humid air stream 122 into a first inlet 124 of a mixing conduit 126 that is in fluid communication with and downstream of the exhaust fan. In addition, a second inlet 128 of mixing conduit 126 is in fluid communication with an upstream mixing fan 130 that is configured to draw an ambient air stream 132 into second inlet 128 of mixing conduit 126. Within the mixing conduit, the humid and ambient air streams 122, 132 are mixed with one another, and exhausted from an outlet 134 of mixing conduit 136 as a mixed exhaust air stream 136.

In the illustrated embodiment, each of fans 106, 118, and 130 are variable speed fans, although in other embodiments, one or more of fans 106, 118, and 130 may be single speed. Each fan is controlled by a controller 138, which in some embodiments may be dedicated to the drying system, while in other embodiments, may be the main controller of dishwasher 100. Controller 138 may also control heater 112, and in some embodiments, may be capable of controlling the output power and/or heated inlet air stream 114 temperature. In other embodiments, however, heater 112 may simply be an on/off heater, and may not be regulated to a particular power level or air stream temperature.

Controller 138 may also be configured to receive various sensor inputs in order to control drying system 102. For example, one or more environmental sensors, e.g., temperature and/or humidity sensors, may be used to sense environmental conditions of one or more air streams. In the illustrated embodiment, for example, a temperature sensor 140 and humidity sensor 142 may be disposed within or proximate mixing conduit 126 (e.g., in outlet 134 or otherwise downstream of mixing conduit 126) in order to sense temperature and humidity of mixed exhaust air stream 136. In some embodiments, sensors 140 and 142 may also be combined into a single sensor. In addition, in some embodiments, an additional temperature sensor 144 and/or humidity sensor 146 may be used to sense ambient air conditions, e.g., in order to determine a temperature and/or dew point of the ambient air surrounding the dishwasher. In some embodiments, sensors 144, 146 may be disposed proximate an outlet 148 of inlet fan 106, while in other embodiments, sensors 144, 146 may be disposed in other locations, e.g., proximate mixing fan 130 and upstream of mixing conduit 126. In still other embodiments, sensors 144, 146 may be omitted, and sensors 140 and/or 142 may be used to sense ambient air conditions, e.g., by capturing temperature and/or humidity prior to a wash cycle, or at least prior to the drying phase of a wash cycle.

With reference to FIG. 3, it will be appreciated that mixing conduit 126 may be implemented in a number of manners, and may, for example, incorporate a profile that encourages thorough mixing of the humid and ambient air streams. In the embodiment illustrated in FIG. 3, for example, exhaust and mixing fans 118, 130 may be oriented face to face with one another and perpendicular to a longitudinal axis of mixing conduit 126. In addition, one or more partitions, dividers, or mixing blades may be incorporated within the interior of mixing conduit 126 to optimize mixing of the humid and ambient air streams.

In addition, it will be appreciated that an inlet air conduit 150 may be used to route the heated inlet air stream from heater 112 to inlet 116 of wash tub 104, and an exhaust air conduit 152 may be used to route the humid air stream from outlet 120 of wash tub 104 to exhaust fan 118. Conduits 150, 152 are generally configured to route the air streams along the sidewalls of the wash tub from and to the space underneath the wash tub to limit the external visibility of the components of the drying system and stay within the required form factor of the dishwasher. It will also be appreciated that various vents, grates, filters, etc. may also be utilized in drying system 102 to provide access to the ambient environment around the dishwasher in an aesthetically acceptable manner.

An example implementation of an operational sequence that may be employed by controller 138 of FIG. 4 is illustrated at 200 in FIG. 5. In this embodiment, operational sequence 200 performs an entire wash cycle, including a drying phase at the end that incorporates high air flow and heat to reduce drying time, with the speeds of three variable speed fans controlled during the drying phase responsive to the humidity or dew point of the air being exhausted and the ambient temperature. It will be appreciated that with increased air flow into and out of the dishwasher, there is a risk of condensation on external surfaces such as countertops and cabinet surfaces, and as such operational sequence

200 controls fan speeds to maintain a mixed exhaust air dew point that is less than the ambient temperature in the room to inhibit condensation.

It will also be appreciated that a drying phase may be performed independently of or at different points within a wash cycle. It may be desirable, for example, to support a separate "dry only cycle," or to periodically perform a drying phase or operation to prevent smells from building up in the wash tub.

Operational sequence 200 begins in block 202 by optionally capturing initial ambient temperature and humidity. As noted above, for example, it may be desirable in some embodiments to utilize only one temperature sensor 140 and one humidity sensor 142 disposed proximate the outlet of mixing conduit 126, and omit any additional sensors capable of sensing ambient environmental conditions. As such, at the start of a wash cycle, or in some instances, at other points in the wash cycle prior to the drying phase and prior to humid air being drawn from the wash tub, sensors 140, 142 may be used to capture ambient temperature and humidity. In other instances, ambient temperature and/or humidity may be captured incrementally throughout the day. Where additional sensors such as sensors 144, 146 are used, however, block 202 may be omitted. In addition, as noted above in connection with FIG. 2, ambient temperature and/or humidity may be captured in some embodiments by a smart thermostat in the same ambient environment as, and in communication with, the dishwasher, such that determining the ambient temperature and/or humidity may be performed by communicating with the thermostat to obtain the current temperature and/or humidity sensed by the thermostat.

Next, in block 204, the wash cycle is performed up to the drying phase, in a manner that will be understood by those of ordinary skill having the benefit of the instant disclosure. Thus, at the start of the drying phase, the wash tub is saturated with hot, humid air, and control passes to block 206 to start all fans on low speed. In some embodiments, the "low" fan speed may differ for each fan (and may be zero in some instances), and in some instances, the starting times at which each fan is started may differ (e.g., to delay starting the mixing fan). In some embodiments, for example, it may be desirable to maintain the wash tub environment at a lower pressure compared to the ambient environment, and to operate exhaust fan 118 at a speed that provides a higher flow rate of humid air out of wash tub 104 than the flow rate of inlet air into wash tub 104.

Next, in block 208, a heater temperature target (e.g., about 200 degrees Fahrenheit) may be set, and a loop may be initiated in block 210 to perform the drying phase until a drying phase completion criterion is met. In some embodiments, the criterion may be time based, while in other embodiments, the criterion may be based on sensed conditions, e.g., a humidity level sensed by humidity sensor 142 that is below a threshold, or within some threshold difference from the sensed ambient humidity. A time-based criterion may also be used to account for any sensor failures that inhibit meeting a humidity-based criterion within a predetermined period of time.

Assuming that the criterion is not met, block 210 passes control to block 212 to determine if an exit dew point, calculated based upon temperature and humidity readings captured by sensors 140, 142, is below ambient temperature (calculated in block 202 in some embodiments, or captured from temperature 144 in some embodiments). The exit dew point may be calculated from the temperature and humidity of the mixed exhaust air stream 136 in various manners understood by those of ordinary skill having the benefit of the instant disclosure, including, for example, the Magnus formula. In some embodiments, additional variables, e.g., atmospheric pressure, may also be sensed and utilized to calculate the dew point.

If the exit dew point is below ambient temperature, then there is a lowered risk that condensation will occur, so control passes to block 214 to determine if the inlet fan is currently at its maximum speed. If so, control passes to block 216 to decrement or decrease the mixing fan speed, and then control returns to block 210. If the inlet fan is not at its maximum speed, block 214 passes control to block 218 to increment or increase the exhaust and inlet fan speeds, such that the flow rate of the humid air stream supplied by exhaust fan 118 is increased relative to that of the ambient air stream supplied by mixing fan 130, and thus the volume of humid air in the mixed exhaust air stream is increased relative to that of the ambient air stream.

After block 218, block 220 determines if the inlet fan is above half speed (e.g., a PWM of 50% for a pulse modulated width-based fan control), and if so, passes control to block 222 to use the inlet vent as a target temperature for the heater. Control then returns to block 210. If, on the other hand, the inlet fan is not above half speed, block 220 skips block 222 and returns control to block 210, such that temperature directly next to the heater is used as the target temperature for the heater. In particular, in some embodiments, it may be desirable to sense temperature both directly next to the heater and farther downstream and proximate the inlet vent, but control the heater output at lower inlet fan speeds based upon the sensed temperature proximate the heater, while controlling the heater output at higher inlet fan speeds based upon sensed temperature further downstream. Doing so may mitigate large temperature gradients in the inlet conduit. In other embodiments, however, other manners of controlling the heater may be used, including control based on a temperature sensed at a single location. In still other embodiments, the heater output may be controlled independent from operational sequence 200.

Returning to block 212, if the exit dew point is not less than ambient temperature, then there is an increased risk that condensation will occur, so control passes to block 224 to determine if the mixing fan is at its maximum speed. If not, control passes to block 226 to increment or increase the mixing fan speed, such that the flow rate of the ambient air stream supplied by mixing fan 130 is increased relative to that of the humid air stream supplied by exhaust fan 118, and thus the volume of humid air in the mixed exhaust air stream is decreased relative to that of the ambient air stream. Control then returns to block 210.

Returning to block 224, if the mixing fan is at its maximum speed, control passes to block 228 to decrement the exhaust and inlet fan speeds, which further decreases the volume of humid air in the mixed exhaust air stream relative to that of the ambient air stream. Control then returns to block 210.

The loop initiated in block 210 therefore continues until the drying phase completion criterion is determined to be met, and with the relative speeds of the inlet, exhaust and mixing fans regulated to exhaust humid air from the wash tub as quickly as possible, while still maintaining the dew point of the exhausted air below ambient temperature. Once the completion criterion is met, operational sequence 200, and the drying phase, is complete.

It will be appreciated that the relative speeds of the fans, the amounts they are incremented or decremented, and their respective minimum and maximum speeds may vary in different embodiments. In some instances, these variables may be determined empirically for a particular dishwasher design. In addition, other variables associated with operational sequence, e.g., target temperatures, polling intervals, etc. may vary in different embodiments. Therefore, the invention is not limited to the specific implementation illustrated in FIG. 5.

Drying systems other than that illustrated in FIGS. 3-5 may also be used in other embodiments. For example, in some embodiments, no separate inlet fan may be used, such that the exhaust fan may be used to both draw humid air out of the wash tub and draw heated inlet air into the wash tub. In such embodiments, therefore, the air supply to the wash tub may include only a conduit (and in some embodiments, a heater as well) in fluid communication with the ambient environment and configured to direct inlet air into the wash tub as a result of negative pressure produced in the wash tub by the exhaust fan. Heat may also be provided by the calrod heater used to heat wash fluid. Furthermore, it will be appreciated that in some embodiments the ambient air stream supplied by the mixing fan may be generally untreated, as well as controlled independently from any inlet air stream supplied to the wash tub by an inlet fan or other air supply.

Multi-Stage Dishwasher Drying System

It may also be desirable in some embodiments to employ a multi-stage dishwasher drying system that performs a multi-stage drying operation while utilizing a variable position gate device in combination with one or more fans.

In some embodiments consistent with the invention, for example, a mixing conduit may be used to mix air streams from an exhaust fan that draws humid air from a wash tub and ambient air that is drawn from the surrounding environment of the dishwasher, and a gate device may be utilized to regulate the relative flow rates of the air streams into the mixing conduit to lower a dew point of the air that is exhausted by the dishwasher, and thereby reduce the likelihood of condensation on external surfaces on and/or surrounding the dishwasher. In some embodiments, an additional mixing fan may also be used to further control the flow rate of the ambient air stream into the mixing conduit.

As will become more apparent below, in some instances, an additional inlet fan may also be used to direct ambient air into the wash tub as inlet air, and in some instances, the ambient air may be heated prior to being supplied to the wash tub. In addition, in some embodiments, one or more of the fans may be variable speed fans, and the environmental conditions of the exhausted air and of the ambient environment (e.g., temperature and/or humidity) may be monitored during a drying phase of a wash cycle to control fan speed(s) to maintain the dew point of the exhausted air below the ambient room temperature.

In some embodiments, a multi-stage drying operation may include a first stage during which the gate device is controlled while the exhaust fan is running to vary the relative flow rates of the humid air exiting the wash tub and the ambient air drawn into the mixing conduit, until such time as the gate device reaches a maximum position. During the first stage, the inlet fan may be deactivated, and no heating of air entering the wash tub may occur. Then, in a second stage, a second fan, e.g., the inlet fan may be activated, and optionally a heater may be activated, to begin to introduce heated ambient air into the wash tub. In addition, both the gate device and one or more of the fans may be controlled during the second stage to maintain the dew point of the exhausted air below the ambient room temperature.

Figure 6:
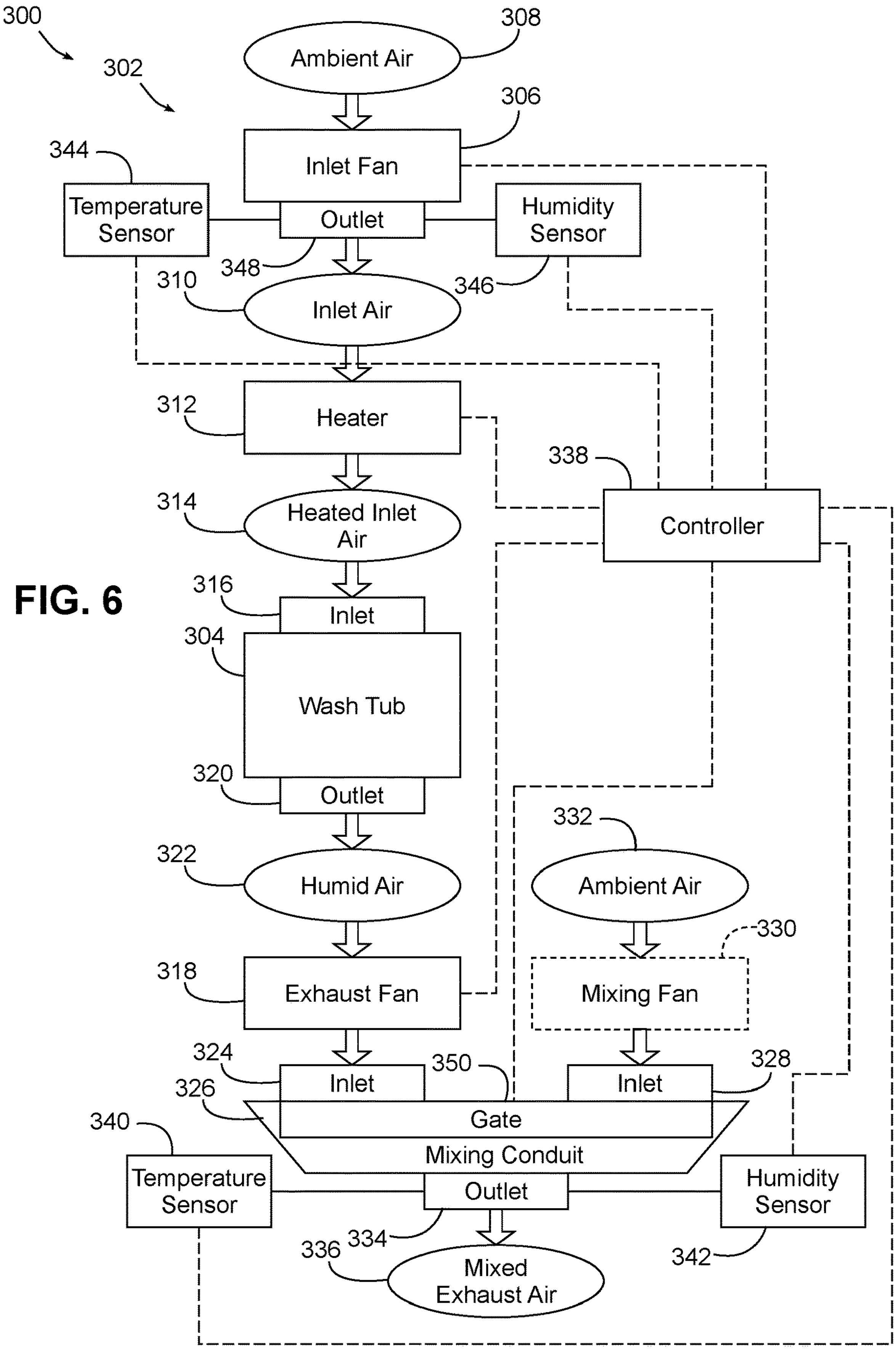
FIG. 6 is a block diagram of a portion of another dishwasher consistent with some embodiments of the invention, and including a multi-stage drying system.
Figure 7:
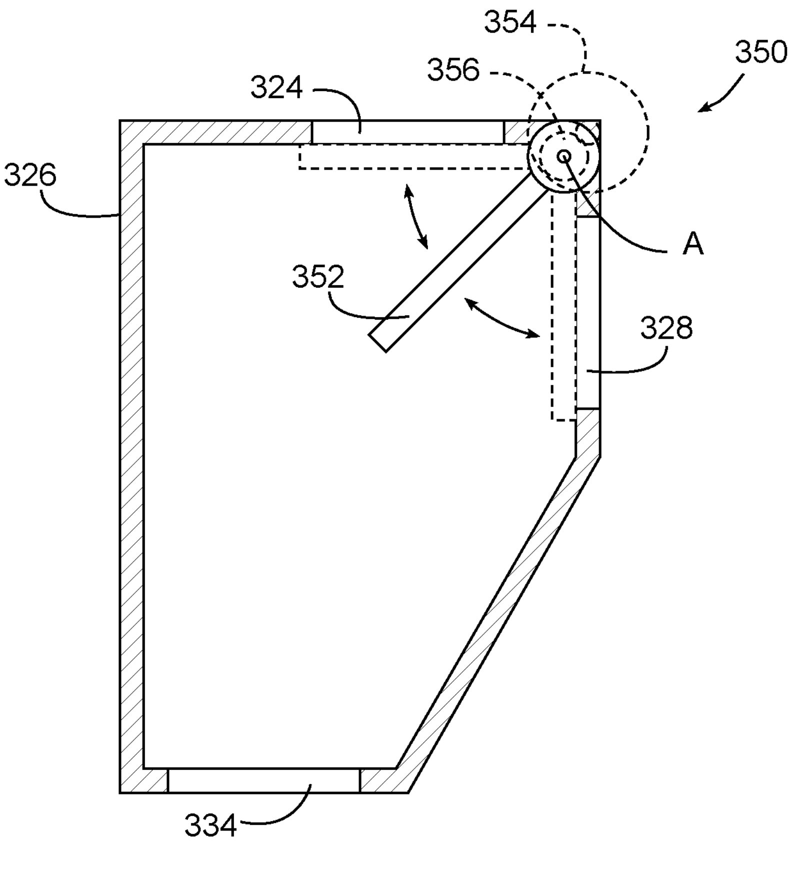
FIG. 7 is a cross-sectional view of a portion of the drying system of FIG. 6.
Figure 8:
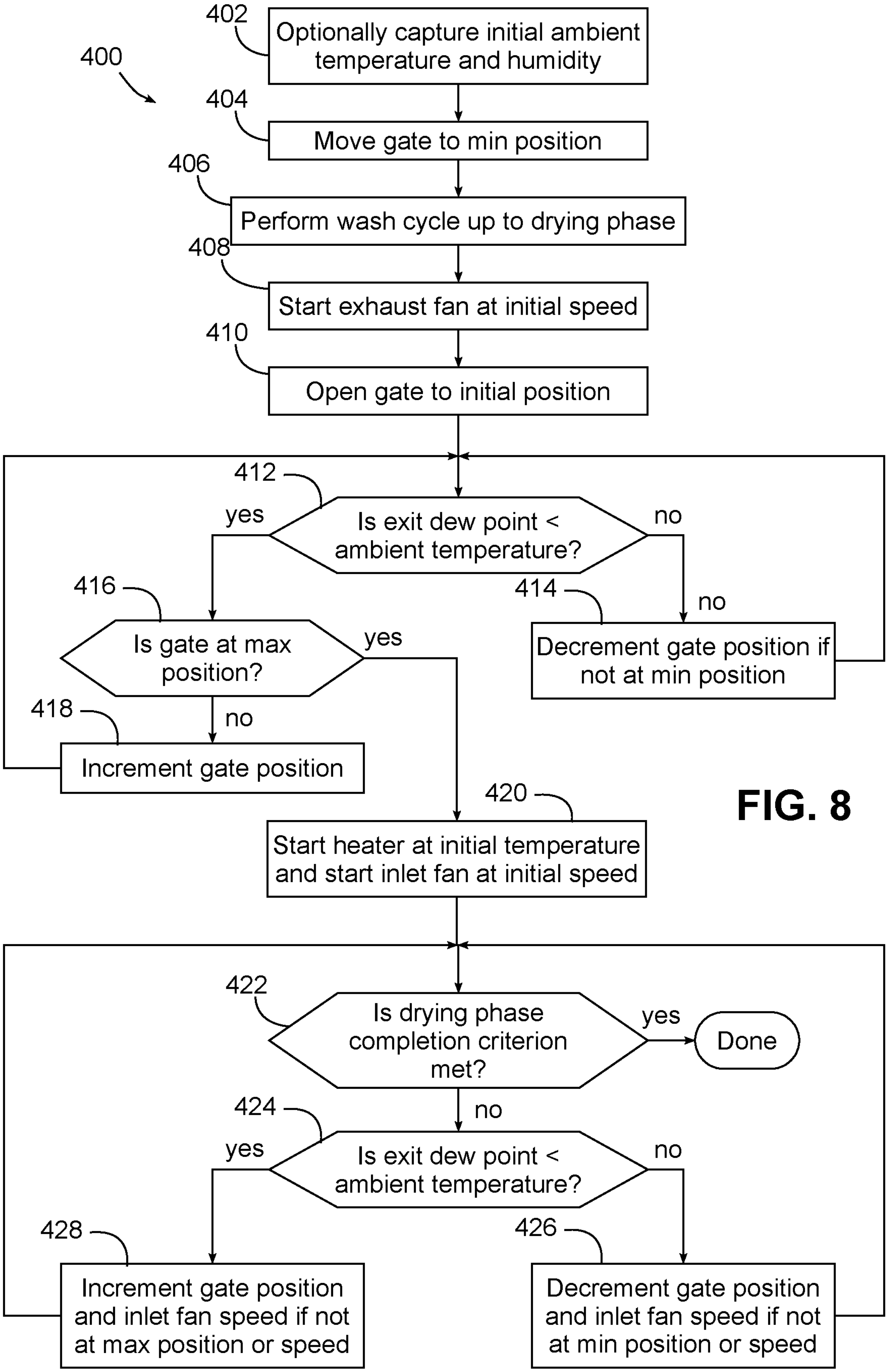
FIG. 8 is a flowchart illustrating an example operational sequence for performing a wash cycle in the dishwasher of FIG. 6.

FIGS. 6-8, for example, illustrate a dishwasher 300 including a drying system 302 consistent with some embodiments of the invention. FIG. 6, in particular, functionally illustrates a wash tub 304 of dishwasher 300, along with various components of drying system 302. In this embodiment, two fans are utilized to drive two primary air streams, an inlet air stream that is directed into wash tub 304, and a humid air stream that is drawn out of wash tub 304. In addition, a third primary stream is an ambient air stream (which in some embodiments may be driven by a fan) that is mixed with the humid air stream to lower the dew point of the humid air stream prior to being exhausted out of the dishwasher.

With reference to FIG. 6, an air supply for wash tub 304 may include an inlet fan 306 configured to draw in ambient air 308 from the environment surrounding the dishwasher to generate an inlet air stream 310. In some embodiments, it may also be desirable for the air supply to also heat the inlet air stream, e.g., by a heater 312, thereby generating a heated inlet air stream 314. The heated inlet air stream 314 is supplied to an inlet 316 of wash tub 304 during a drying phase of a wash cycle. The air supplied to the wash tub absorbs moisture present in the wash tub, and an exhaust fan 318 draws the now-humid air out of an outlet 320 in wash tub 304, forming a humid air stream 322.

Exhaust fan 318 directs the humid air stream 322 into a first inlet 324 of a mixing conduit 326 that is in fluid communication with and downstream of the exhaust fan. In addition, a second inlet 328 of mixing conduit 326 is in fluid communication with the ambient environment, optionally through an upstream mixing fan 330 that is configured to draw an ambient air stream 332 into second inlet 328 of mixing conduit 326. In other embodiments, however, mixing fan 330 may be omitted. Within the mixing conduit, the humid and ambient air streams 322, 332 are mixed with one another, and exhausted from an outlet 334 of mixing conduit 336 as a mixed exhaust air stream 336.

In the illustrated embodiment, each of fans 306, 318, and 330 are variable speed fans, although in other embodiments, one or more of fans 306, 318, and 330 may be single speed. Each fan is controlled by a controller 338, which in some embodiments may be dedicated to the drying system, while in other embodiments, may be the main controller of dishwasher 300. Controller 338 may also control heater 312, and in some embodiments, may be capable of controlling the output power and/or heated inlet air stream 314 temperature. In other embodiments, however, heater 312 may simply be an on/off heater, and may not be regulated to a particular power level or air stream temperature.

Controller 338 may also be configured to receive various sensor inputs in order to control drying system 302. For example, one or more environmental sensors, e.g., temperature and/or humidity sensors, may be used to sense environmental conditions of one or more air streams. In the illustrated embodiment, for example, a temperature sensor 340 and humidity sensor 342 may be disposed within or proximate mixing conduit 326 (e.g., in outlet 334 or otherwise downstream of mixing conduit 326) in order to sense temperature and humidity of mixed exhaust air stream 336. In some embodiments, sensors 340 and 342 may also be combined into a single sensor. In addition, in some embodiments, an additional temperature sensor 344 and/or humidity sensor 346 may be used to sense ambient air conditions, e.g., in order to determine a temperature and/or dew point of the ambient air surrounding the dishwasher. In some embodiments, sensors 344, 346 may be disposed proximate an outlet 348 of inlet fan 306, while in other embodiments, sensors 344, 346 may be disposed in other locations, e.g., proximate mixing fan 330 and upstream of mixing conduit 326. In still other embodiments, sensors 344, 146 may be omitted, and sensors 340 and/or 342 may be used to sense ambient air conditions, e.g., by capturing temperature and/or humidity prior to a wash cycle, or at least prior to the drying phase of a wash cycle.

With additional reference to FIG. 7, a gate device 350 is also incorporated into mixing conduit 326 to regulate the flow of air into one or both of inlets 324, 328. In the illustrated embodiment, for example, gate device 350 may incorporate a movable valve member 352 that rotates about an axis A to selectively move from a position proximate inlet 324 to a position proximate inlet 328. In some embodiments, valve member 352 may be rotatable to positions that fully seal one or both of inlets 324, 328, although in other embodiments, valve member 352 may not fully close off one or both of inlets 324, 328. Movement of valve member 352 about axis A may be controlled using a motor 354, which in some embodiments may be coupled to valve member 352 through a gear arrangement 356. Motor 354 may be implemented in some embodiments as a stepper motor that incorporates position sensing, while in other embodiments, other motor designs may be used, and one or more separate position sensors may be used to monitor the current position of the valve member.

It will be appreciated that mixing conduit 326 may also be implemented in a number of manners, and may, for example, incorporate a profile that encourages thorough mixing of the humid and ambient air streams, and one or more partitions, dividers, or mixing blades may be incorporated within the interior of mixing conduit 326 in some embodiments to optimize mixing of the humid and ambient air streams. It will also be appreciated that various vents, grates, filters, etc. may also be utilized in drying system 302 to provide access to the ambient environment around the dishwasher in an aesthetically acceptable manner.

It will be appreciated that, by rotating valve member 352 about axis A, the relative flow rates of air entering inlets 324 and 328 may be controlled, with movement of valve member 352 towards inlet 324 decreasing the flow rate through inlet 324 relative to inlet 328, and movement towards inlet 328 decreasing the flow rate through inlet 328 relative to inlet 324. It will be appreciated, however, that gate device 350 may be implemented in a number of different manners in other embodiments. For example, other manners of moving a valve member to control relative flow rates, e.g., through linear motion, may be used. In addition, a gate device in some embodiments may only regulate air flow through a single inlet 324 or 328, while in other embodiments, a gate device may independently regulate air flow through both inlets, e.g., using multiple valve members that are independently controllable. Other suitable gate device designs will be apparent to those of ordinary skill having the benefit of the instant disclosure.

An example implementation of an operational sequence that may be employed by controller 338 of FIG. 6 is illustrated at 400 in FIG. 8. In this embodiment, operational sequence 400 performs an entire wash cycle, including a multi-stage drying operation at the end that incorporates at least first and second stages, with the first stage incorporating control over gate device 350 responsive to the exit dew point, but without activating inlet fan 306 or heater 312, and then with the second stage incorporating activation of the inlet fan and heater, such that both the inlet fan speed and the gate device are controlled responsive to the exit dew point. It will be appreciated that during the initial portion of a drying phase, the interior of the wash tub will generally be at an elevated temperature, so by delaying the activation of the inlet fan and heater to a second stage, the wash tub is able to reach a lower exhaust dew point at the beginning of the dry operation. In addition, delaying the activation may also result in lower noise and lower overall power consumption for the drying operation in some embodiments.

Operational sequence 400 begins in block 402 by optionally capturing initial ambient temperature and humidity. As noted above, for example, it may be desirable in some embodiments to utilize only one temperature sensor 340 and one humidity sensor 342 disposed proximate the outlet of mixing conduit 326, and omit any additional sensors capable of sensing ambient environmental conditions. As such, at the start of a wash cycle, or in some instances, at other points in the wash cycle prior to the drying phase and prior to humid air being drawn from the wash tub, sensors 340, 342 may be used to capture ambient temperature and humidity. In other instances, ambient temperature and/or humidity may be captured incrementally throughout the day. Where additional sensors such as sensors 344, 346 are used, however, block 402 may be omitted.

Next, in block 404, the gate device is moved to its minimum position, which in the illustrated embodiment, is a position in which inlet 324 is fully closed by valve member 352, thereby effectively closing off outlet 320 of wash tub 304. Next, in block 406, the wash cycle is performed up to the drying phase, in a manner that will be understood by those of ordinary skill having the benefit of the instant disclosure. Thus, at the start of the drying phase, the wash tub is saturated with hot, humid air, and control passes to blocks 408 and 410 to initiate a first stage of a multi-stage drying operation that initially starts the exhaust fan at an initial speed (block 408) and initially opens the gate device to an initial position. In some embodiments, the initial fan speed may be a relatively low speed, while in other embodiments, the initial fan speed may be a higher speed, up to a maximum speed in some embodiments. In addition, the initial position of gate device 350 may be a position that is proximate to inlet 324, but still allowing some air flow of humid air stream 322 through the inlet. During this first stage, however, any other fans, e.g., inlet fan 306 and mixing fan 330 (if included), are deactivated, as is heater 312.

Next, in block 412 a loop may be initiated to perform the first stage of the drying phase until a stage transition criterion is met. In the illustrated embodiment, the stage transition criterion is met when the exit dew point is below the ambient temperature and the gate is already at its maximum position, although other criteria may be used in other embodiments.

Block 412 determines if the exit dew point, calculated based upon temperature and humidity readings captured by sensors 340, 342, is below ambient temperature (calculated in block 402 in some embodiments, or captured from temperature 344 in some embodiments). The exit dew point may be calculated from the temperature and humidity of the mixed exhaust air stream 336 in various manners understood by those of ordinary skill having the benefit of the instant disclosure, including, for example, the Magnus formula. In some embodiments, additional variables, e.g., atmospheric pressure, may also be sensed and utilized to calculate the dew point.

If the exit dew point is not less than ambient temperature, then there is an increased risk that condensation will occur, so control passes to block 414 to decrement the gate position, such that the flow rate of the humid air stream supplied by exhaust fan 318 is decreased, and thus the volume of humid air in the mixed exhaust air stream is decreased relative to that of the ambient air stream. If the gate is at its minimum position, however, the gate will be maintained at that position. Control then returns to block 412.

If, however, the exit dew point is below ambient temperature, then there is a lowered risk that condensation will occur, so control passes to block 416 to determine if the gate is at its maximum position. If not, then control passes to block 418 to increment the gate position, such that the flow rate of the humid air stream supplied by exhaust fan 318 is increased relative to that of the ambient air stream, and thus the volume of humid air in the mixed exhaust air stream is increased relative to that of the ambient air stream.

If, however, the gate is at its maximum position, a transition to the second stage of the drying phase occurs by passing control from block 416 to block 420. In block 420, the heater is activated, and a heater temperature target (e.g., about 400 degrees Fahrenheit) may be set. In addition, inlet fan 306 may be activated and set to an initial speed, e.g., a relatively high speed in some embodiments.

Block 422 then initiates a loop to perform the second stage of the drying phase. Block 422 determines whether a drying phase completion criterion has been met. In some embodiments, the criterion may be time based, while in other embodiments, the criterion may be based on sensed conditions, e.g., a humidity level sensed by humidity sensor 342 that is below a threshold, or within some threshold difference from the sensed ambient humidity. A time-based criterion may also be used to account for any sensor failures that inhibit meeting a humidity-based criterion within a predetermined period of time.

Next, block 424 determines if the exit dew point, calculated based upon temperature and humidity readings captured by sensors 340, 342, is below ambient temperature, in a similar manner to block 412. If not, then there is an increased risk that condensation will occur, so control passes from block 424 to block 426 to decrement the gate position and decrease the inlet fan speed. If so, then there is a lowered risk that condensation will occur, so control instead passes from block 424 to block 428 to increment the gate position and increase the inlet fan speed. In each of blocks 426, 428, movement of the gate beyond its minimum and maximum positions, and driving the inlet fan beyond its minimum and maximum speeds, is restricted. At the completion of each of block 426, 428, control returns to block 422, such that the second stage of the drying phase continues until the drying phase completion criterion has been met.

It will be appreciated that the relative speeds of the fans, the amounts they are incremented or decremented, and their respective minimum and maximum speeds may vary in different embodiments. Further the relative positions of the gate, and the amounts it is incremented or decremented, and its minimum and maximum positions may vary in different embodiments. In some instances, these variables may be determined empirically for a particular dishwasher design. In addition, other variables associated with operational sequence, e.g., target temperatures, polling intervals, etc. may vary in different embodiments. Therefore, the invention is not limited to the specific implementation illustrated in FIG. 8.

Other operational sequences may also be used in other embodiments. For example, the speed of exhaust fan and/or of a mixing fan (if used) may also be controlled responsive to the exit dew point in some implementations. In addition, where independent control of each inlet to the mixing conduit is supported by a gate device, air flow regulation may be based in part on the independent control of each inlet.

It will also be appreciated that, while certain features may be discussed herein in connection with certain embodiments and/or in connection with certain figures, unless expressly stated to the contrary, such features generally may be incorporated into any of the embodiments discussed and illustrated herein. Moreover, features that are disclosed as being combined in some embodiments may generally be implemented separately in other embodiments, and features that are disclosed as being implemented separately in some embodiments may be combined in other embodiments, so the fact that a particular feature is discussed in the context of one embodiment but not another should not be construed as an admission that those two embodiments are mutually exclusive of one another. Various additional modifications may be made to the illustrated embodiments consistent with the invention. Therefore, the invention lies in the claims hereinafter appended.

What is claimed is:

1. A dishwasher, comprising:

a wash tub;

at least one spray device disposed in the wash tub;

a fluid supply configured to supply wash fluid to the at least one spray device;

an air supply in fluid communication with the wash tub and configured to direct an inlet air stream into the wash tub, the air supply including an inlet fan in fluid communication with and upstream of the wash tub;

an exhaust fan configured to draw a humid air stream from the wash tub from a position downstream of the wash tub;

a mixing conduit including first and second inlets and an outlet, the first inlet of the mixing conduit in fluid communication with and downstream of the exhaust fan such that the exhaust fan communicates the humid air stream from the wash tub to the first inlet of the mixing conduit, and the second inlet of the mixing conduit configured to receive an ambient air stream that mixes with the humid air stream to thereby lower a dew point of the humid air stream exhausted from the outlet of the mixing conduit;

a gate device disposed in the mixing conduit downstream of the exhaust fan and movable within a range of positions to regulate fluid flow through at least one of the first and second inlets; and a controller coupled to the inlet fan and the gate device, the controller configured to, during a first stage of a multi-stage drying operation, vary a position of the gate device within the range of positions while the inlet fan is deactivated, and during a second stage of the multi-stage drying operation, vary the position of the gate device and vary a speed of the inlet fan while the inlet fan is activated;

wherein the controller is further configured to, during the first stage of the multi-stage drying operation, set an initial speed of the exhaust fan below a maximum speed of the exhaust fan and set an initial position of the gate device that is proximate the first inlet and that still allows for some fluid flow of the humid air stream through the first inlet.

2. The dishwasher of claim 1, wherein the controller is further configured to vary a speed of the exhaust fan during at least a portion of the drying operation.

3. The dishwasher of claim 1, further comprising:

at least one environmental sensor configured to sense an environmental condition of air exhausted from the outlet of the mixing conduit; and a mixing fan in fluid communication with and upstream of the second inlet of the mixing conduit and configured to direct the ambient air stream into the second inlet of the mixing conduit;

wherein the controller is further configured to vary a speed of the mixing fan, a speed of the exhaust fan, the speed of the inlet fan, and the position of the gate device during at least a portion of the drying operation to maintain the dew point of the humid air stream exhausted from the outlet of the mixing conduit below a temperature of an ambient environment within which the dishwasher is installed.

4. The dishwasher of claim 1, further comprising at least one environmental sensor configured to sense an environmental condition of air exhausted from the outlet of the mixing conduit.

5. The dishwasher of claim 4, wherein the controller is coupled to the at least one environmental sensor and is configured to vary the speed of the inlet fan and the position of the gate device to maintain the dew point of the humid air stream exhausted from the outlet of the mixing conduit below a temperature of an ambient environment within which the dishwasher is installed.

6. The dishwasher of claim 5, wherein the at least one environmental sensor is configured to sense a temperature and/or a humidity of the humid air stream exhausted from the outlet of the mixing conduit.

7. The dishwasher of claim 6, wherein the controller is configured to determine the temperature of the ambient environment using the at least one environmental sensor and prior to performing a drying operation with the inlet fan, the exhaust fan and the gate device.

8. The dishwasher of claim 1, wherein the air supply further includes a heater configured to heat the inlet air stream, and the controller is configured to deactivate the heater during the first stage of the multi-stage drying operation and activate the heater during the second stage of the multi-stage drying operation.

9. The dishwasher of claim 1, wherein the first stage precedes the second stage and the controller is configured to transition from the first stage to the second stage in response to determining that the gate device is in a predetermined position and that the dew point of the humid air stream exhausted from the outlet of the mixing conduit is less than the ambient temperature.

10. A dishwasher, comprising:

a wash tub;

at least one spray device disposed in the wash tub;

a fluid supply configured to supply wash fluid to the at least one spray device;

an air supply in fluid communication with the wash tub and configured to direct an inlet air stream into the wash tub, the air supply including an inlet fan in fluid communication with and upstream of the wash tub;

an exhaust fan configured to draw a humid air stream from the wash tub from a position downstream of the wash tub;

a mixing conduit including first and second inlets and an outlet, the first inlet of the mixing conduit in fluid communication with and downstream of the exhaust fan such that the exhaust fan communicates the humid air stream from the wash tub to the first inlet of the mixing conduit, and the second inlet of the mixing conduit configured to receive an ambient air stream that mixes with the humid air stream to thereby lower a dew point of the humid air stream exhausted from the outlet of the mixing conduit;

a gate device disposed in the mixing conduit downstream of the exhaust fan and movable within a range of positions to regulate fluid flow through at least one of the first and second inlets; and a controller coupled to the inlet fan and the gate device, the controller configured to vary a speed of the inlet fan and a position of the gate device within the range of positions during at least a portion of a drying operation;

wherein the controller is further configured to, during the drying operation, set an initial speed of the exhaust fan below a maximum speed of the exhaust fan and set an initial position of the gate device that is proximate the first inlet and that still allows for some fluid flow of the humid air stream through the first inlet.

11. The dishwasher of claim 10, wherein the controller is further configured to vary a speed of the exhaust fan during at least a portion of the drying operation.

12. The dishwasher of claim 10, further comprising:

at least one environmental sensor configured to sense an environmental condition of air exhausted from the outlet of the mixing conduit; and a mixing fan in fluid communication with and upstream of the second inlet of the mixing conduit and configured to direct the ambient air stream into the second inlet of the mixing conduit;

wherein the controller is further configured to vary a speed of the mixing fan, a speed of the exhaust fan, the speed of the inlet fan, and the position of the gate device during at least a portion of the drying operation to maintain the dew point of the humid air stream exhausted from the outlet of the mixing conduit below a temperature of an ambient environment within which the dishwasher is installed.

13. The dishwasher of claim 10, further comprising at least one environmental sensor configured to sense an environmental condition of air exhausted from the outlet of the mixing conduit.

14. The dishwasher of claim 13, wherein the controller is coupled to the at least one environmental sensor and is configured to vary the speed of the inlet fan and the position of the gate device to maintain the dew point of the humid air stream exhausted from the outlet of the mixing conduit below a temperature of an ambient environment within which the dishwasher is installed.

15. The dishwasher of claim 14, wherein the at least one environmental sensor is configured to sense a temperature and/or a humidity of the humid air stream exhausted from the outlet of the mixing conduit.

16. The dishwasher of claim 15, wherein the controller is configured to determine the temperature of the ambient environment using the at least one environmental sensor and prior to performing a drying operation with the inlet fan, the exhaust fan and the gate device.

17. The dishwasher of claim 10, wherein the ambient air stream directed into the second inlet of the mixing conduit is untreated.

18. The dishwasher of claim 10, wherein the air supply further includes a heater configured to heat the inlet air stream.

19. The dishwasher of claim 10, wherein the drying operation is a multi-stage drying operation including at least a first stage preceding a second stage, wherein the controller is configured to vary the position of the gate device within the range of positions while the inlet fan is deactivated during the first stage and to vary the speed of the inlet fan and the position of the gate device within the range of positions while the inlet fan is activated during the second stage.

* * * * *